United States Patent
Matsuura et al.

(10) Patent No.: US 7,434,460 B2
(45) Date of Patent: Oct. 14, 2008

(54) SEALING STRUCTURE AND A FLOWMETER USING THE SAME

(75) Inventors: Hideki Matsuura, Kariya (JP); Noboru Kitahara, Kariya (JP); Yasushi Goka, Kariya (JP)

(73) Assignee: Denso Corporation (JP)

( * ) Notice: Subject to any disclaimer, the term of this patent is extended or adjusted under 35 U.S.C. 154(b) by 414 days.

(21) Appl. No.: 11/318,553

(22) Filed: Dec. 28, 2005

(65) Prior Publication Data

US 2008/0008224 A1 Jan. 10, 2008

(30) Foreign Application Priority Data

Dec. 28, 2004 (JP) ............................. 2004-378786

(51) Int. Cl.
*G01F 1/68* (2006.01)
*G01F 1/684* (2006.01)

(52) U.S. Cl. ................. 73/204.22; 73/202.5; 73/204.11

(58) Field of Classification Search .................. 73/202, 73/202.5, 204.11–204.27
See application file for complete search history.

(56) References Cited

U.S. PATENT DOCUMENTS

| | | | | |
|---|---|---|---|---|
| 6,516,785 B1 * | 2/2003 | Nakada et al. | ............... | 123/494 |
| 6,640,627 B2 * | 11/2003 | Sato et al. | ................ | 73/204.22 |
| 6,854,326 B2 * | 2/2005 | Watanabe et al. | ......... | 73/204.22 |
| 7,234,349 B2 | 6/2007 | Kitahara et al. | | |
| 2004/0011125 A1 * | 1/2004 | Kozawa et al. | ........... | 73/204.22 |
| 2004/0129073 A1 * | 7/2004 | Saito et al. | ................ | 73/204.22 |

FOREIGN PATENT DOCUMENTS

| | | | |
|---|---|---|---|
| JP | 05340776 A | * | 12/1993 |
| JP | 6-160144 | | 6/1994 |

OTHER PUBLICATIONS

Kitahara; U.S. Appl. No. 11/108,797, filed Apr. 19, 2005 based on JP 2004-133756.

* cited by examiner

*Primary Examiner*—Edward Lefkowitz
*Assistant Examiner*—Punam Patel
(74) *Attorney, Agent, or Firm*—Nixon & Vanderhye PC

(57) ABSTRACT

A substrate includes a first surface portion, which covers a heat receiving portion of a radiation member together with a resinous member. The substrate further includes a second surface portion, which is on the outer periphery of the first surface portion. The substrate makes contact with the resinous member via the second surface portion. The first surface portion and the heat receiving portion have a first contact boundary therebetween. The second surface portion and the resinous member have a second contact boundary that surrounds the first contact boundary. The second contact boundary is sealed using a sealing member. The sealing member is restricted from flowing into a boundary between the first contact boundary and the second contact boundary.

10 Claims, 4 Drawing Sheets

FIG. 3A
FIG. 3C
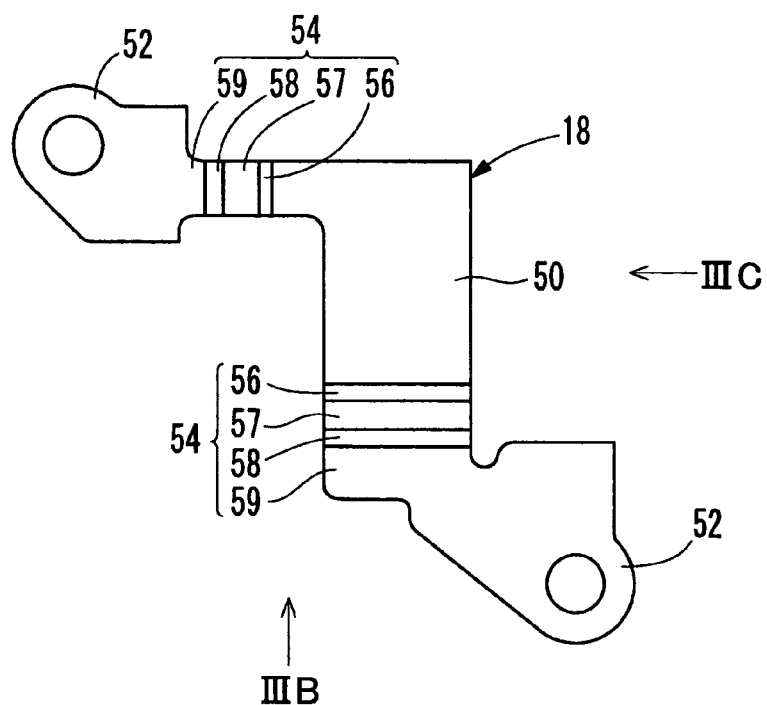
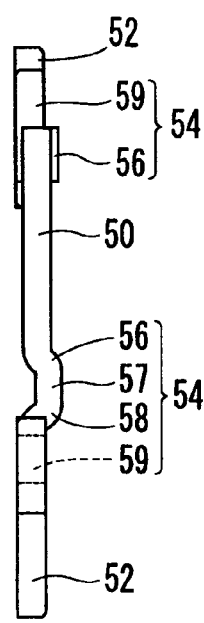
FIG. 3B
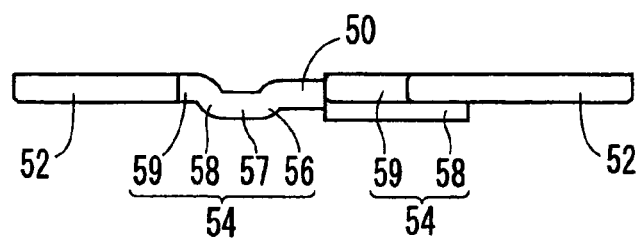

SEALING STRUCTURE AND A FLOWMETER USING THE SAME

CROSS REFERENCE TO RELATED APPLICATIONS

This application is based on and incorporates herein by reference Japanese Patent Application No. 2004-378786 filed on Dec. 28, 2004.

FIELD OF THE INVENTION

The present invention relates to a sealing structure and an apparatus using the sealing structure.

BACKGROUND OF THE INVENTION

Conventionally, a flowmeter has a detecting portion that detects a flow amount of fluid. The flowmeter includes a control circuit that electrically controls the detecting portion. The flowmeter has a sealing structure, in which the control circuit is accommodated in a casing member, and is embedded in a gelled material, thereby protecting the control circuit.

In this structure, the control circuit may cause disorder due to heat radiating from the control circuit. According to JP-A-6-160144, a radiation member is insert-molded in a resinous member, which serves as the casing member, so that heat of the control circuit is radiated to the outside of the casing member via the radiation member.

In this structure, a boundary, which is between the resinous member and the radiation member, has the periphery that connects with the sealing material in the casing member. The boundary has a gap due to thermal shrinkage caused in the insert molding. Therefore, the sealing material may leak to the outside of the casing member through the boundary, which is between the resinous member and the radiation member. In the above structure, the area of the boundary between the resinous member and the radiation member is set large, so that a path, through which the sealing material leaks, is set long. However, as long as the sealing material flows into the boundary between the resinous member and the radiation member through the periphery of the boundary, the sealing material cannot be sufficiently restricted from leaking. In addition, flow of liquid in the direction opposite to the leakage of the sealing material cannot be sufficiently restricted. For example, liquid such as water in the outside of the casing member cannot be sufficiently restricted from intruding into the casing member through the boundary between the resinous member and the radiation member.

SUMMARY OF THE INVENTION

In view of the foregoing and other problems, it is an object of the present invention to produce a sealing structure, in which a sealing performance can be enhanced, and an apparatus using the sealing structure.

According to one aspect of the present invention, a sealing structure includes a casing portion, an electric circuit, a radiation member, and a sealing member. The casing portion includes a resinous member. The electric circuit includes a substrate, which is supported using the resinous member in the casing portion. The radiation member is at least partially embedded in the resinous member. The radiation member radiates heat emitted from the electric circuit to an outside of the casing portion. The sealing member seals the electric circuit in the casing portion. The radiation member includes a heat receiving portion, an exposed portion, and a connecting portion. The connecting portion connects the heat receiving portion with the exposed portion. The heat receiving portion receives the heat of the electric circuit. The heat receiving portion is covered with the substrate and the resinous member. The connecting portion is covered with the resinous member. The exposed portion is out of the resinous member and is exposed to an outside of the casing portion. The substrate includes a first surface portion and a second surface portion. The first surface portion covers the heat receiving portion of the radiation member together with the resinous member. The second surface portion is provided on an outer peripheral side of the first surface portion. The second surface portion makes contact with the resinous member. The first surface portion and the heat receiving portion have a first contact boundary therebetween. The second surface portion and the resinous member have a second contact boundary therebetween. The second contact boundary surrounds the first contact boundary. The second contact boundary is sealed.

A flow detecting apparatus may include the sealing structure. The flow detecting apparatus includes a detecting portion that detects an amount of fluid flowing in a flow passage. The electric circuit may electrically control the detecting portion.

Alternatively, a sealed circuit includes a resinous member, a radiation member, a substrate, and a sealing member. The radiation member is at least partially embedded in the resinous member. The radiation member includes a heat receiving portion that is out of the resinous member. The substrate covers the heat receiving portion of the radiation member together with the resinous member. The sealing member outwardly seals the substrate. The substrate includes a first surface portion and a second surface portion. The second surface portion surrounds an outer periphery of the first surface portion. The first surface portion of the substrate makes contact with the heat receiving portion of the radiation member via a first contact boundary. The second surface portion of the substrate makes contact with the resinous member via a second contact boundary. The second contact boundary surrounds the first contact boundary. The second contact boundary is sealed using the sealing member.

A method, which is for forming a sealing structure, includes following processes. A radiation member is insert-formed at least partially in a resinous member such that a heat receiving portion of the radiation member is out of the resinous member. A first surface portion of a substrate is overlapped onto the heat receiving portion of the radiation member simultaneously with that the second surface portion of the substrate is overlapped onto the resinous member, such that the first surface portion of the substrate covers the heat receiving portion of the radiation member together with the resinous member. A contact boundary between the second surface portion of the substrate and the resinous member is sealed using a sealing member.

Thus, the substrate and the resinous member make contact with the sealing member via the periphery thereof, thereby being sealed therebetween.

BRIEF DESCRIPTION OF THE DRAWINGS

The above and other objects, features and advantages of the present invention will become more apparent from the following detailed description made with reference to the accompanying drawings. In the drawings:

FIG. 3A is a front view showing a radiation member, FIG. 3B is a view when being from the arrow IIIB in FIG. 3A, and FIG. 3C is a view when being viewed from the arrow IIIC in FIG. 3A, according to the first embodiment;

DETAILED DESCRIPTION OF PREFERRED EMBODIMENTS

First Embodiment

Figure 1:
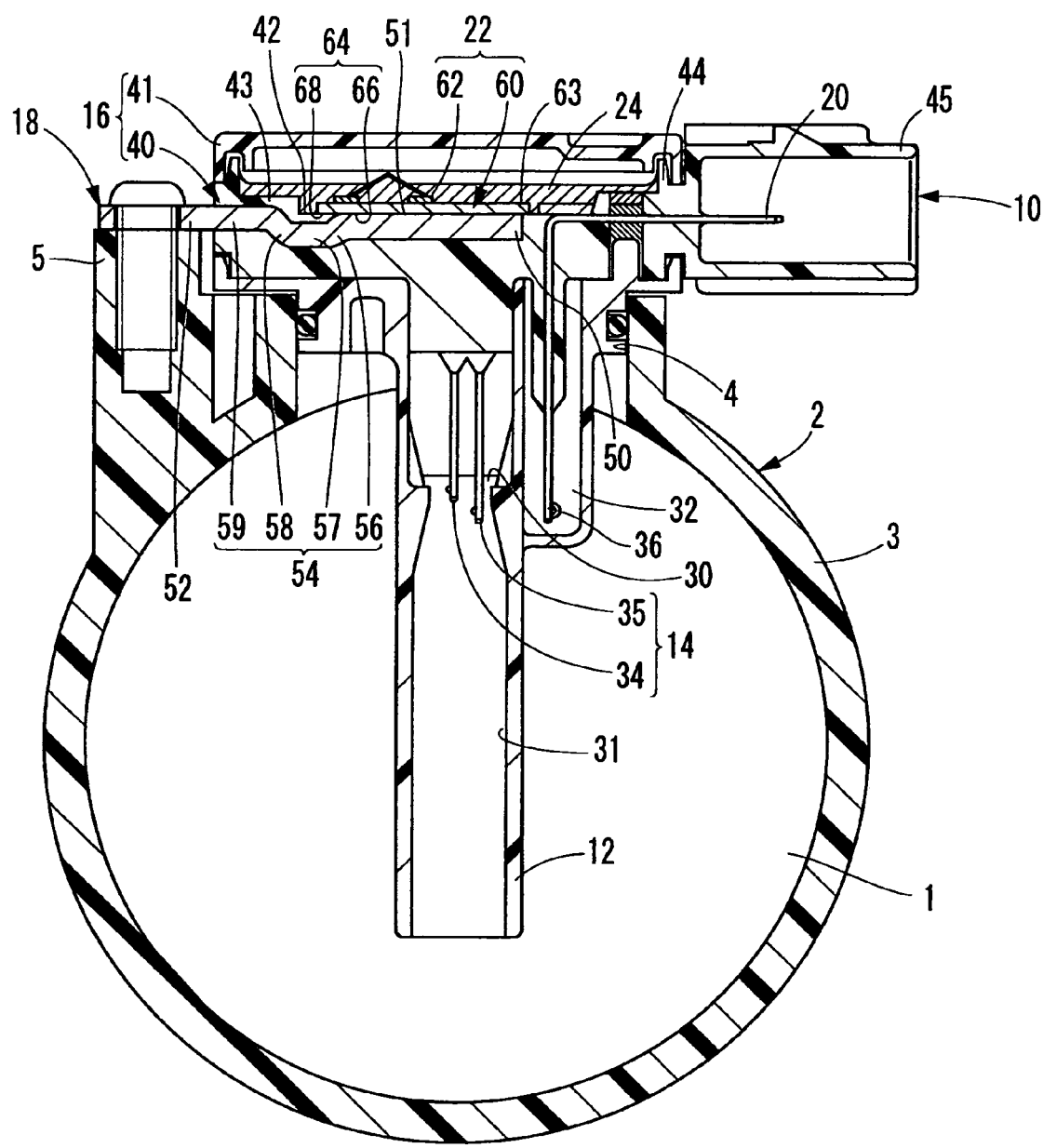
FIG. 1 is a partially cross sectional side view showing a flowmeter, according to a first embodiment of the present invention.
Figure 2:
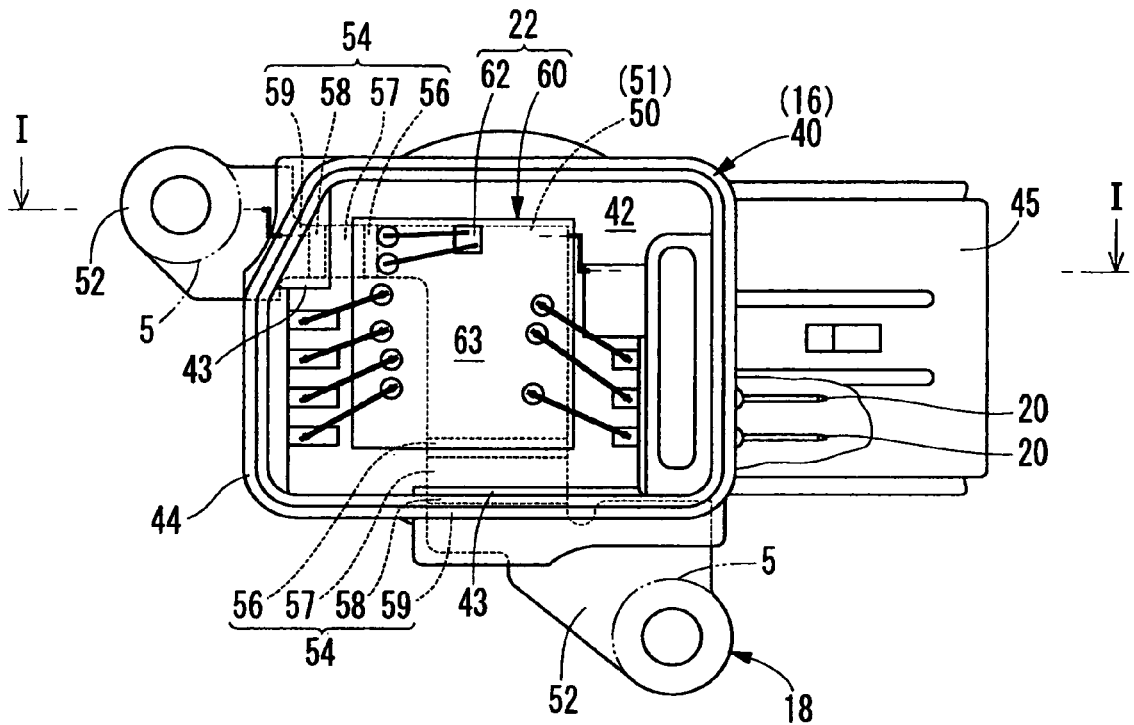
FIG. 2 is a top view showing a sealing structure of the flowmeter according to the first embodiment.

FIG. 1 is a partially cross sectional side view taken along the line I-I in FIG. 2. As shown in FIGS. 1, 2, a flow detecting apparatus (flowmeter) 10 is mounted to a flow passage forming member (flow passage member) 2, which has a flow passage 1 for detecting a flow amount of air passing through the flow passage 1. The flow passage member 2 is an intake pipe, which is provided in an intake system of an internal combustion engine, for example. Alternatively, the flow passage member 2 may be an air cleaner case. The flow passage member 2 has a through hole portion 4 and supporting members 5. The through hole portion 4 has a through hole penetrating a flow passage wall 3. The supporting members 5 respectively protrude from the outer circumferential periphery of the flow passage wall 3. The number of the supporting members 5 is two, for example. The flowmeter 10 is constructed of a bypass portion 12, a detecting portion 14, a casing portion 16, a radiation member 18, terminals 20, a control circuit (electric circuit) 22, a sealing member 24, and the like. The bypass portion 12 is formed in a substantially pipe shape, and is connected with a base 40 of the casing portion 16. The bypass portion 12 air-tightly engages with the through hole portion 4 of the flow passage member 2, and penetrates the flow passage wall 3 from the side of the outer circumferential periphery of the flow passage wall 3 into the side of the inner circumferential periphery of the flow passage wall 3. The bypass portion 12 is partitioned using a partition wall 30, thereby internally forming a U-shaped first bypass passage 31 and a second bypass passage (not shown). The U-shaped first bypass passage 31 has two end portions that respectively communicate with the flow passage 1.

The detecting portion 14 includes a heater element 34 and a thermo detecting element 35 that are supported by the base 40. The heater element 34 and the thermo detecting element 35 respectively protrude into the first bypass passage 31. The heater element 34 detects a flow amount of air passing from the air passage 1 into the first bypass passage 31. The thermo detecting element 35 detects temperature of air passing from the air passage 1 into the first bypass passage 31.

The casing portion 16 includes the base 40 and a cover 41. The base 40 is formed of resin to be in a tray shape having an opening, which is closed with the cover 41. The base 40 has a bottom portion 42 that makes contact with a second surface portion 68 of the substrate 60 of the control circuit 22, thereby supporting the substrate 60 of the control circuit 22. The outer periphery of the bottom portion 42 of the base 40 has the protruding portions 43 that respectively extend from the bottom portion 42 to the cover 41. The number of the protruding portions 43 is two, for example.

The protruding portions 43 are in the vicinity of the inner periphery of a peripheral portion 44 of the base 40. The peripheral portion 44 of the base 40 has a connecter portion 45. The connector portion 45 engages with a wire harness, which is electrically connected with an electronic control unit (ECU). The base 40 serves as a resinous member, and the bottom portion 42 serves as the supporting surface portion.

As shown in FIGS. 1 to 3C, the radiation member 18 is formed of metal such as aluminum to be in a substantially Z-shaped plate. The radiation member 18 is embedded in the base 40 by an insert forming, such as insert molding. The radiation member 18 has a heat receiving portion 50 in the center of the radiation member 18, such that the heat receiving portion 50 is covered with the substrate 60 and the base 40. The heat receiving portion 50 has a contact surface portion 51 that is exposed from the base 40. The contact surface portion 51 makes contact with a first surface portion 66 of the substrate 60. The contact surface portion 51 receives heat radiating from the control circuit 22. The radiation member 18 has end portions, to which exposed portions 52 are provided. The exposed portions 52 are respectively exposed from the base 40 to the outside of the casing portion 16. The exposed portions 52 are respectively screwed to the corresponding supporting members 5 of the flow passage member 2. As shown in FIGS. 3A, 3B, the radiation member 18 further includes connecting portions 54. Each connecting portion 54 connects one end portion of the heat receiving portion 50 with the corresponding exposed portion 52 therebetween. The connecting portions 54 are completely covered with the base 40.

Each connecting portion 54 includes a first bent portion 56, a recess portion 57, a second bent portion 58, and a plate portion 59 from the side of the heat receiving portion 50 to the exposed portion 52 in this order.

The first bent portion 56 connects with the heat receiving portion 50. The first bent portion 56 is bent to the opposite side of the second surface portion 68 of the substrate 60 with respect to the heat receiving portion 50. The recess portion 57 connects with the first bent portion 56. The recess portion 57 is bent to the opposite side of the heat receiving portion 50 with respect to the first bent portion 56. The second bent portion 58 connects with the recess portion 57. The second bent portion 58 is located on the side of the exposed portion 52 with respect to the first bent portion 56. The second bent portion 58 is bent to the side of the corresponding protruding portion 43 of the base 40 with respect to the recess portion 57. The plate portion 59 connects with the second bent portion 58 and the exposed portion 52. The plate portion 59 is bent to the side of the exposed portion 52 with respect to the second bent portion 58. In this structure, the heat receiving portion 50, the plate portion 59, and the exposed portion 52 are located in substantially the same plane in the radiation member 18. The recess portion 57 is recessed to the opposite side of the second surface portion 68 of the substrate 60 with respect to the heat receiving portion 50, the plate portion 59, and the exposed portion 52.

The heat receiving portion 50 receives heat radiating from the control circuit 22 in the radiation member 18. The heat received by the heat receiving portion 50 transmits to the connecting portion 54, which are located on both sides of the heat receiving portion 50, and the exposed portion 52 in the radiation member 18. Thus, the radiation member 18 radiates the heat radiating from the control circuit 22 to the atmosphere, which is in the outside of the casing portion 16, and to the supporting member 5.

The terminals 20 are insert formed with the base 40, so that the terminals 20 are embedded in the base 40. Each terminal 20 connects to one of the control circuit 22 and a thermistor 36. The terminal 20 protrudes into the connector portion 45, thereby being capable of electrically connecting with the ECU via a wire harness provided to the connector portion 45, so that output signals of the control circuit 22 and the thermistor 36 are transmitted to the ECU. The thermistor 36 is supported by the base 40. The thermistor 36 protrudes into a space portion 32, which is formed integrally with the bypass portion 12, thereby detecting temperature of air flowing from the air passage 1 into the space portion 32.

Figure 4:
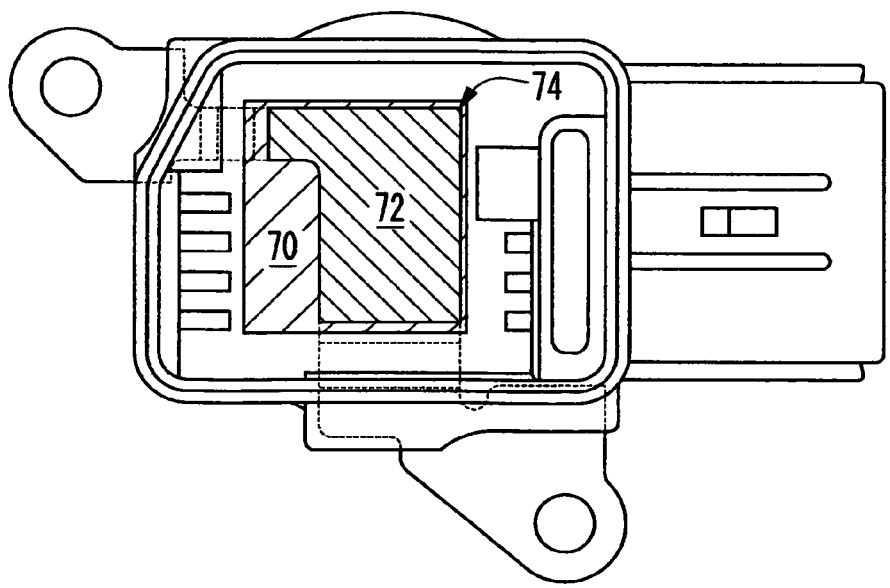
FIG. 4 is a schematic top view showing the sealing structure of the flowmeter.

The control circuit 22 is an electric circuit constructed of the substrate 60, on which circuit element 62 is mounted. The control circuit 22 is accommodated in the casing portion 16. The substrate 60 is formed of alumina or the like to be in a substantially plate shape, for example. The substrate 60 has a substrate surface 64 on the opposite side of a mount surface 63, on which the circuit element 62 is mounted. The substrate surface 64 of the substrate 60 is bonded to both the contact surface portion 51 of the heat receiving portion 50 of the radiation member 18 and the bottom portion 42 of the base 40, using adhesive or the like. The first surface portion 66 of the substrate 60, via which the substrate surface 64 of the substrate 60 is connected to the contact surface portion 51 of the radiation member 18, is formed in a substantially L-shape. The second surface portion 68 of the substrate 60, via which the substrate surface 64 of the substrate 60 is connected to the bottom portion 42 of the base 40, is formed in a substantially annular shape, which surrounds the outer periphery of the first surface portion 66. As schematically shown in FIG. 4, second surface portion 68 of the substrate 60 and the bottom portion 42 of the base 40 form a second contact boundary 70 therebetween. The second contact boundary 70 is shown by the hatched area, which is formed of diagonally right up lines in FIG. 4.

The first surface portion 66 of the substrate 60 and the contact surface portion 51 of the radiation member 18 form a first contact boundary 72 therebetween. The first contact boundary 72 is shown by the hatched area, which is formed of diagonally left up lines in FIG. 4.

The second contact boundary 70 surrounds the first contact boundary 72, and liquid-tightly seals therebetween. The radiation member 18 and the base 40 define a formed boundary 74 therebetween. The border of the formed boundary 74 connects to a boundary portion between the inner periphery of the second contact boundary 70 and the outer periphery of the first contact boundary 72, thereby surrounded by the substrate 60.

A generally known material may be used for bonding the first surface portion 66 of the substrate 60 with the contact surface portion 51 of the radiation member 18 and for bonding the second surface portion 68 of the substrate 60 with the bottom portion 42 of the base 40. For example, a silicone adhesive may be used as this bonding material to secure both the sealing performance in the second contact boundary 70 and thermal conductivity in the first contact boundary 72. As a bonding method, the first surface portion 66 of the substrate 60 and the second surface portion 68 may be overlapped onto the corresponding contact surface portion 51 of the radiation member 18 and the corresponding bottom portion 42 of the base 40, after painting an adhesive on the first surface portion 66 and the second surface portion 68 and/or after painting an adhesive on the contact surface portion 51 and the bottom portion 42, for example.

The control circuit 22 is electrically connected with the heater element 34 and the thermo detecting element 35, thereby controlling electricity supplied to the heater element 34 and the thermo detecting element 35. Specifically, the control circuit 22 controls the electricity supplied to the heater element 34 such that a difference between temperature of the heater element 34 and air temperature detected using the thermo detecting element 35 becomes constant. The amount of electricity supplied to the heater element 34 varies corresponding to a flow amount of air flowing from the air passage 1 into the first bypass passage 31. The amount of this electricity substantially indicates the flow amount of air passing through the air passage 1. Therefore, the control circuit 22 outputs the amount of electricity supplied to the heater element 34 to the ECU as a detection signal of the flow amount.

The sealing member 24 is formed of a gelled material such as silicone gel, thereby sealing the control circuit 22 together with the bottom portion 42 of the base 40 and the protruding portion 43 of the base 40.

In the above flow meter 10, the periphery of the formed boundary 74 between the radiation member 18 and the base 40 is covered with the substrate 60, so that the periphery of the formed boundary 74 does not make contact with the sealing member 24 covering the substrate 60.

The second surface portion 68 of the substrate 60 and the bottom portion 42 of the base 40 make contact with the sealing member 24 via the periphery thereof. The second contact boundary 70 surrounds the first contact boundary 72, which is between the first surface portion 66 of the substrate 60 and the contact surface portion 51 of the radiation member 18, so that the second contact boundary 70 is sealed. Therefore, the sealing member 24 can be restricted from flowing into the formed boundary 74, which connects with the boundary portion between the contact boundaries 70, 72.

Furthermore, the inner periphery of the second contact boundary 70 connects with and seals the periphery of the formed boundary 74. Therefore, even when liquid such as water outside of the casing portion 16 intrudes into the formed boundary 74 from the side of the exposed portion 52 of the radiation member 18, the liquid can be restricted from intruding into the casing portion 16 through the second contact boundary 70.

In the sealing structure (sealed circuit) of the flow meter 10, the sealing performance of the casing portion 16, which accommodates the control circuit 22, can be enhanced.

In addition, the gelled sealing member 24 protects the control circuit 22 in the flowmeter 10, and heat emitted from the control circuit 22 is radiated to the outside of the casing portion 16 via the radiation member 18. Thus, the control circuit can be protected from causing disorder.

The one piece of the radiation member 18 has both a function for radiating heat from the control circuit 22 to the outside of the casing portion 16 and a function as a bracket member for supporting the control circuit 22 to the flow passage member 2. Therefore, the number of components can be reduced, and manufacturing cost of the sealing structure of the flow meter 10 can be reduced. The radiation member 18 has the first bent portion 56 that is bent to the opposite side of the second surface portion 68 with respect to the heat receiving portion 50. In this structure, the connecting portion 54 can be covered with the base 40, such that the connecting portion 54, which is adjacent to the heat receiving portion 50 making contact with the first surface portion 66 of the substrate 60, can be restricted from making contact with the second surface portion 68. The above structure, in which the sealing performance is enhanced, can be readily produced by bending the radiation member 18, for example.

The protruding portion 43 of the base 40 protrudes over, i.e., beyond the bottom portion 42, which makes contact with the second surface portion 68 of the substrate 60. In the connecting portion 54, the second bent portion 58 connecting with the first bent portion 56 via the recess portion 57 is bent to the side of the protruding portion 43. In this structure, the exposed portion 52 and the heat receiving portion 50 can be located in substantially the same plane such that the plate portion 59 of the connecting portion 54 is not exposed from the base 40. Therefore, the position of the exposed portion 52 can be set in a substantially the same position as in a conventional structure, in which a heat receiving portion and an exposed portion are provided in a plate-shaped heat radiation member. Therefore, the shape of the supporting member 5 need not be changed from the shape designed for a conventional structure.

Furthermore, when external force, which pulls the heat radiation member 18 to the outside of the casing portion 16, is applied to one of the exposed portions 52, the first and second bent portions 56, 58 on the side of the exposed portion 52 hook to the base 40. Therefore, the heat radiation member 18 can be restricted from being pulled out of the base 40. Thus, durability of the sealing structure can be enhanced.

In addition, in the manufacturing process of the above structure, an adhesive is painted on the first surface portion 66 and the second surface portion 68 and/or an adhesive is painted on the contact surface portion 51 and the bottom portion 42, and subsequently, the first surface portion 66 and the second surface portion 68 are overlapped onto the corresponding contact surface portion 51 and the corresponding bottom portion 42, for example. In this manufacturing process, the control circuit 22 can be readily assembled to the base 40, for example, so that manufacturing cost of the flowmeter 10 including the above structure can be reduced.

The structure and the manufacturing method are not limited to the above description.

Figure 5:
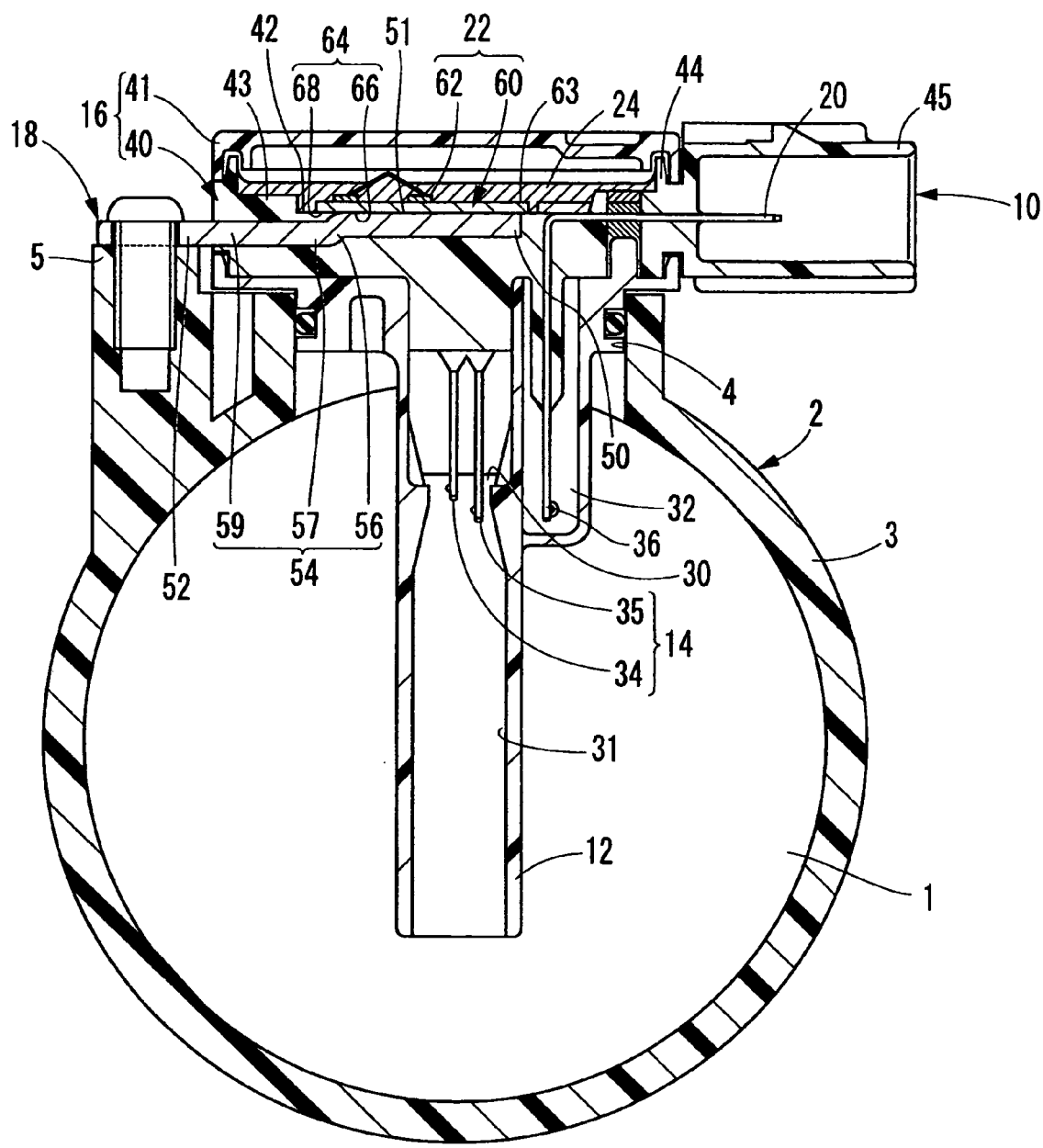
FIG. 5 is a partially cross sectional side view showing a flowmeter according to a variation of the first embodiment of the present invention.

For example, as shown in FIG. 5, the heat radiation member 18 does not include the second bent portion 58, and the recess portion 57 is directly connected to the plate portion 59, so that the exposed portion 52 is set on a plane different from the plane, in which the heat receiving portion 50 is provided. Alternatively, the heat radiation member 18 may not include the recess portion 57, and the first bent portion 56 may be directly connected with the second bent portion 58. Alternatively, both the recess portion 57 and the second bent portion 58 may not provided to the heat radiation member 18, and the first bent portion 56 may be directly connected with the plate portion 59, so that the plate portion 59 and the exposed portion 52 may extend to the side, on which the first bent portion 56 is bent.

The number of the exposed portion 52 and the number of the connecting portion 54 in the heat radiation member 18 can be determined as appropriate. The exposed portion 52 may be positioned in a location, which is out of the casing member 16 and is in the flow passage member 2. Furthermore, a portion excluding the exposed portion 52, such as a portion of the base 40 may be connected to the supporting member 5 of the flow passage member 2.

In addition, as long as the second contact boundary 70, which is between the second surface portion 68 of the substrate 60 and the bottom portion 42 of the base 40, is sealed, at least one of the base 40 and the heat radiation member 18 may be screwed to the substrate 60. In addition, a plate-shaped substrate body, which constructs the mount surface 63, and a sheet-shaped seal member, which forms the substrate surface 64, may be overlapped to construct the substrate 60. The second contact boundary 70 between the second surface portion 68 of the substrate surface 64 of the seal member and the bottom portion 42 of the base 40 may be sealed using the seal member. Furthermore, the first contact boundary 72, which is between the first surface portion 66 of the substrate 60 and the contact surface portion 51 of the heat radiation member 18, may be sealed with an adhesive as described above, and may be non-sealed.

The above structures of the embodiments can be combined as appropriate.

In the above embodiments, the sealing structure is used in the flowmeter. However, the sealing structure is not limited to be used in a flowmeter. The sealing structure can be used for any other accommodating structures.

Various modifications and alternations may be diversely made to the above embodiments without departing from the spirit of the present invention.

What is claimed is:

1. A sealing structure comprising:
   a casing portion that includes a resinous member;
   an electric circuit that includes a substrate, which is supported using the resinous member in the casing portion;
   a radiation member that is at least partially embedded in the resinous member, the radiation member radiating heat emitted from the electric circuit to an outside of the casing portion; and
   a sealing member that seals the electric circuit in the casing portion,
   wherein the radiation member includes a heat receiving portion, an exposed portion, and a connecting portion, the connecting portion connecting the heat receiving portion with the exposed portion,
   the heat receiving portion receives the heat of the electric circuit,
   the heat receiving portion is covered with the substrate and the resinous member,
   the connecting portion is covered with the resinous member,
   the exposed portion is out of the resinous member and is exposed to an outside of the casing portion,
   the substrate includes a first surface portion and a second surface portion,
   the first surface portion covers the heat receiving portion of the radiation member together with the resinous member,
   the second surface portion is provided on an outer peripheral side of the first surface portion,
   the second surface portion makes contact with the resinous member,
   the first surface portion and the heat receiving portion have a first contact boundary therebetween,
   the second surface portion and the resinous member have a second contact boundary therebetween,
   the second contact boundary surrounds the first contact boundary, and
   the second contact boundary is sealed.

2. The sealing structure according to claim 1,
   wherein the connecting portion includes a bent portion that connects with the heat receiving portion, and
   the bent portion is bent to a side opposite to the second surface portion of the substrate.

3. The sealing structure according to claim 1,
   wherein the exposed portion is mounted to a flow passage member of a flow detecting apparatus, and
   the flow passage member has a flow passage.

4. The sealing structure according to claim 1,
   wherein the resinous member includes a supporting surface portion and a protruding portion,
   the supporting surface portion makes contact with the second surface portion of the substrate, the supporting surface portion supporting the substrate,
   the protruding portion protrudes beyond the supporting surface portion,
   the connecting portion includes a first bent portion and a second bent portion, the first bent portion connects with the heat receiving portion, the first bent portion is bent to the side opposite to the second surface portion of the substrate, the second bent portion is provided on a side of the exposed portion with respect to the first bent portion, and the second bent portion is bent to a side of the protruding portion.

5. The sealing structure according to claim 1, wherein the second surface portion is bonded to the resinous member.

6. The sealing structure according to claim 5, wherein the first surface portion is bonded to the heat receiving portion.

7. The sealing structure according to claim 1, wherein the sealing member is formed of a gelled material.

8. A flow detecting apparatus comprising:

the sealing structure according to claim 1; and a detecting portion that detects an amount of fluid flowing in a flow passage, wherein the electric circuit electrically controls the detecting portion.

9. A sealed circuit comprising:

a resinous member;

a radiation member that is at least partially embedded in the resinous member, the radiation member including a heat receiving portion that is out of the resinous member;

a substrate that covers the heat receiving portion of the radiation member together with the resinous member; and a sealing member that outwardly seals the substrate, wherein the substrate includes a first surface portion and a second surface portion, the second surface portion surrounding an outer periphery of the first surface portion, the first surface portion of the substrate makes contact with the heat receiving portion of the radiation member via a first contact boundary, the second surface portion of the substrate makes contact with the resinous member via a second contact boundary, the second contact boundary surrounds the first contact boundary, and the second contact boundary is sealed using the sealing member.

10. A flow detecting apparatus comprising:

a detecting portion that detects an amount of fluid flowing in a flow passage, a casing portion that includes a resinous member;

an electric circuit that includes a substrate, which is supported using the resinous member in the casing portion, the electric circuit electrically controlling the detecting portion;

a radiation member that is at least partially embedded in the resinous member, the radiation member radiating heat emitted from the electric circuit to an outside of the casing portion; and a sealing member that seals the electric circuit in the casing portion, wherein the radiation member includes a heat receiving portion, an exposed portion, and a connecting portion, the connecting portion connecting the heat receiving portion with the exposed portion, the heat receiving portion receiving the heat of the electric circuit, the heat receiving portion is covered with the substrate and the resinous member, the connecting portion is covered with the resinous member, the exposed portion is out of the resinous member and is exposed to an outside of the casing portion, the substrate includes a first surface portion and a second surface portion, the first surface portion covers the heat receiving portion of the radiation member together with the resinous member, the second surface portion is provided on a an outer peripheral side of the first surface portion, the second surface portion makes contact with the resinous member, the first surface portion and the heat receiving portion have a first contact boundary therebetween, the second surface portion and the resinous member have a second contact boundary therebetween, the second contact boundary surrounds the first contact boundary, and the second contact boundary is sealed.

* * * * *